May 19, 1931.　　　　C. C. FARMER　　　　1,805,658
TRIPLE VALVE CYLINDER CAP
Filed Aug. 21, 1928
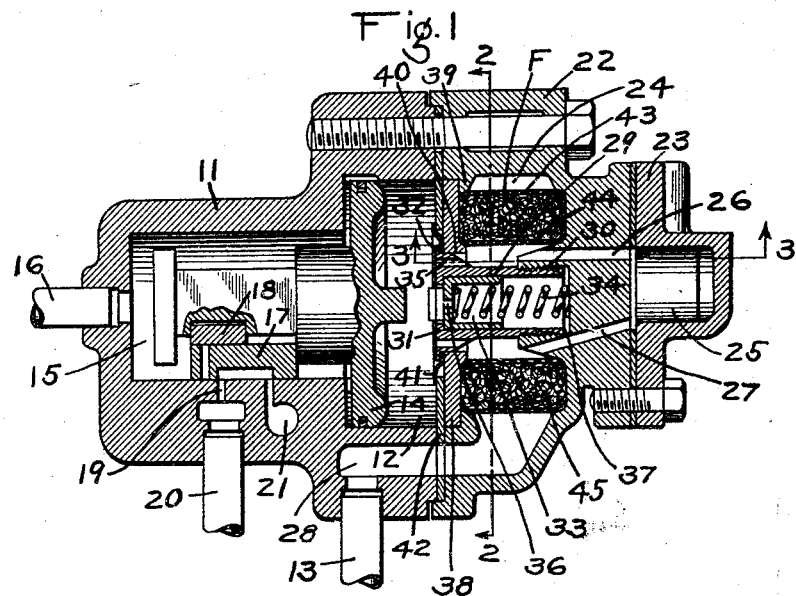
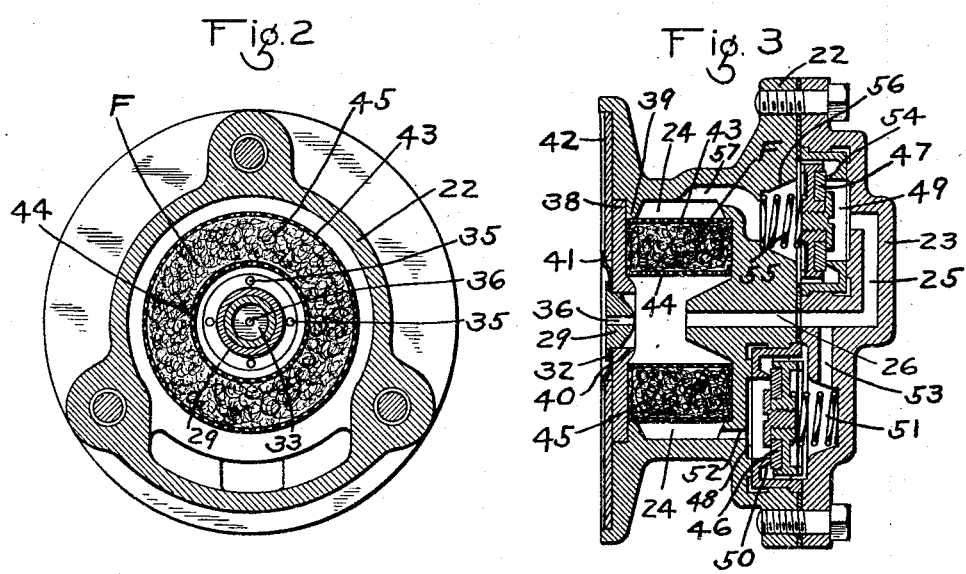
INVENTOR
CLYDE C. FARMER
BY Wm. M. Cady
ATTORNEY Patented May 19, 1931

1,805,658

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRIPLE VALVE CYLINDER CAP

Application filed August 21, 1928. Serial No. 300,984.

This invention relates to fluid pressure operated valve devices, and more particularly to triple valve devices such as are employed in fluid pressure brake systems for controlling the brakes.

An object of the invention is to provide a triple valve device with means for removing foreign matter from the fluid supplied to the brake system.

Another object of the invention is to provide an air filter or strainer which may be readily attached to the standard triple valve devices now in service.

Another object of the invention is to provide means for cleaning the fluid supplied to triple valve devices which permits the operation of the valves under all conditions of service.

Another object of the invention is to provide a triple valve device of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Fig. 1 is a diagrammatic sectional view of a triple valve device provided with my improvement; and Figs. 2 and 3 are sections taken on the lines 2—2 and 3—3 respectively of Fig. 1.

In a fluid pressure brake system, a triple valve device is employed which is subject to brake pipe pressure and which is operated by variations in brake pipe pressure for controlling the application and release of the brakes.

If fluid under pressure supplied to a valve device of the above character should contain foreign matter, such foreign matter will pass with the fluid to the working parts of the valve device, where it may accumulate, and then cause sluggish operation of the valve device, or it may even result in failure of the valve device to operate. Furthermore, foreign matter which passes through the valve device may be carried into the other parts of the brake system, and thereby cause injury or undue wear thereof.

The fluid often contains particles so fine that they will remain in suspension in the air for a considerable period of time, and it has been difficult to eliminate these fine particles and otherwise purify the fluid without affecting the operation of the valve devices.

By the present invention, I have provided a strainer or filter for the brake pipe fluid. The filter is incorporated in the triple valve device structure in such a manner as to permit the operation of the said device under all conditions of service and at the same time prevent the entrance of foreign matter thereinto. If so desired, the improvement may be attached to the standard triple valve devices now in service by simply replacing the graduating spring cap with a cap containing the improvement.

Referring to the drawings, the triple valve device comprises a casing 11 having a piston chamber 12 connected to the brake pipe 13 and containing piston 14 and having a valve chamber 15 connected to the auxiliary reservoir (not shown) by a pipe 16 and containing a main slide valve 17 and a graduating slide valve 18 adapted to be operated by piston 14. The chamber 15 has a port 19 which communicates with the brake cylinder (not shown) through a pipe 20. The seat of the valve 17 is vented to the atmosphere through a port 21.

The open end of the piston chamber 12 is covered by a cap section that is constructed so that it may be applied to the existing triple valve casings now in use in place of the usual cap containing the graduating spring. Preferably the cap section is made in two parts 22 and 23, both of which parts are chambered, as at 24 and 25, and communicate with each other through conduits 26 and 27.

Fluid under pressure is supplied to the piston chamber 12 from the brake pipe 13 by a conduit 28 formed in the casing 11 and communicating with the chamber 24 in the cap section 22.

A cylinder 29 having one end threaded into the cap section 22 at 30 and its opposite end internally flanged at 31 and externally flanged at 32, carries a cap 33 which is normally held against the flange 31 by a graduating spring 34.

The flange 32 of the cylinder 29 has a plurality of holes 35 formed therein to permit the fluid under pressure to pass from the chamber 24 into the piston chamber 12, or vice versa, the fluid in the piston chamber 12 to pass into the chamber 24 when the piston 14 moves outwardly.

The end wall of the cap 33 is perforated at 36 and the inner or threaded end 30 of the cylinder 29 communicates with the conduit 27 through a passage 37 which provides a vent for the cylinder when the cap 33 is engaged by the piston 14 during an emergency and forced inwardly against the pressure exerted by spring 34.

A plate 38 is fitted to the inner open end of the cap section 22, the periphery of the plate engaging the seat provided by a rib 39 formed in the cap section.

The plate 38 has a central opening 40 through which the flanged end of the cylinder 29 projects, the flange 32 of the cylinder bearing against the portion of the plate surrounding the opening for the purpose of pressing the plate against its seat.

If so desired a spring washer 41 may be interposed between the flange 32 and the plate 38, the periphery of the washer being offset from the main body portion thereof so as to engage a gasket 42 which covers the surface of the plate exposed to the piston chamber 12.

Encircling the cylinder 29 and bearing against the plate 38 and the end wall of the cap section 22 is a filter or strainer F comprising a double walled body formed of a pair of spaced perforated cylindrical shells 43 and 44 and containing filtering or straining material 45 which fills the annular space between the two shells.

The filter F is so positioned as to intercept the fluid flowing through the triple valve device and arrest the passage of foreign matter.

Any suitable material can be used, but I prefer to employ curled hair which is impregnated with oil to make the hair sticky so that fine dust and other foreign matter in the fluid will adhere to the hair.

Heretofore it has been found undesirable to oil the parts of the triple valve devices, since the oil tends to collect the fine particles of matter and thus form a gummy coating thereon which tends to retard the action thereof. If the fine particles are removed from the fluid, then the triple valve devices may be oiled, and thus greatly prolong the wear thereof.

Referring to Fig. 3, the device is provided with a pair of check valves 46 and 47, the former being mounted in a chamber 48 formed in the cap section 22, while the latter is mounted in a chamber 49 formed in the cap section 23.

The valve 46 is held normally seated against a seat rib 50 in the chamber 48 by an expansible coil spring 51. The valve thus closes a port 52 connecting the chambers 24 and 48 and thereby prevents the passage of fluid around the filter F and into the piston chamber 12.

The chamber 48 is connected to conduit 26 by a port 53 on the spring side of the valve 46, and as conduit 26 communicates with the interior of the filter F, when the valve 46 is unseated the fluid can by-pass around the filter in a manner to be described.

The valve 47 is held normally seated against a seat rib 54 in the chamber 49 by an expansible coil spring 55. The spring 55 is disposed in a recess 56 formed in the cap section 22, which recess communicates with the chamber 24 through a port 57. The conduit 25 leads directly to chamber 49.

In the normal operation of the device fluid from the brake pipe 13 flows into chamber 24 and passes through the filter F into the space surrounding the cylinder 29, and thence through the openings 35 to the piston chamber. In this way the filter F operates to free the fluid from foreign matter, so that only purified fluid flows into the piston chamber 12.

Under these conditions the check valves 46 and 47 will both remain seated, the former because the spring 51 will press the valve 46 against its seat, and the latter because the direction of flow of the fluid from the brake pipe 13 through the chamber 24 will be towards the spring side of the valve 47, it being understood that the fluid pressure remains uniform in the several chambers of the cap sections by reason of the interconnections provided by the conduits 25, 26 and ports 52, 53 and 57.

If the curled hair 45 of the filter F should become so clogged with foreign matter as to offer substantial resistance to the flow of fluid, then the pressure of fluid in chamber 24 and acting by flow through port 52 on the seated face of the check valve 46 will exceed the combined pressures of fluid supplied through the filter F to passage 53 and that of spring 51, so that the check valve 46 will be lifted from its seat and will then permit flow of fluid from the brake pipe 13 by way of port 52, past check valve 46 to passage 53, and conduit 26 to piston chamber 12.

When the brake pipe pressure is reduced to effect an application of the brakes, fluid under pressure from piston chamber 12 normally flows back to the brake pipe 13 by way of openings 35, through the filter F, and thence into chamber 24 and through conduit 28 to the brake pipe.

If, however, the filter becomes clogged, so as to materially interfere with the flow of fluid, then the higher pressure of fluid flowing from piston chamber 12 through the openings 35 will pass through conduits 26 and 27 into conduit 25 and chamber 49 and unseat the check valve 47 against the lower pressure in the brake pipe which acts in chamber 24 and port 57, and consequently fluid will be vented past the check valve 47 through port 57, chamber 24, and conduit 28, to the brake pipe.

It will thus be seen that normally the fluid under pressure as supplied to or vented from the triple valve device is freed from foreign matter by flow through the filter F, but in either case, should the filter become clogged, the flow of fluid will not be interfered with to an extent which would prevent the desired operation of the valve device.

The functional and structural objects above stated are thus seen to be obtained in the construction described. It is to be understood that certain features of the invention are capable of modification and combination in fluid pressure actuated devices of other types without sacrifice of the attendant advantages.

Having now described my invention, what I claim as new and desire to secure by Letters Patent, is:—

1. A valve device having a piston chamber open at one end, a cap enclosing the chamber, said cap having a chamber provided with a vented wall adjacent the piston chamber, means for supplying fluid to the chamber in the cap, a filter mounted in the cap and surrounding the vents in the wall, and a check valve controlling a by-pass around the filter and operated upon clogging of the filter to permit flow of fluid from the cap chamber through the by-pass passage.

2. A valve device having a piston chamber open at one end, a cap enclosing the chamber, said cap having a chamber provided with a vented wall adjacent the piston chamber, means for supplying fluid to the chamber in the cap, a filter mounted in the cap and surrounding the vents in the wall, and a pair of check valves, each controlling a by-pass around the filter and operated upon clogging of the filter to permit flow of fluid in either direction from the supply means through the by-pass passages.

3. A valve device comprising a piston chamber open at one end, a cap enclosing the chamber, said cap being composed of inner and outer sections, each having chambers, the chamber of the inner section communicating with the piston chamber and also with fluid supply means, the chamber of the outer section being in communication with the inner section chamber by by-pass passages, a filter mounted in the chamber of the inner section in the path of the fluid flowing therethrough, and means in the by-pass passages for normally closing the same, said means being adapted to open the by-pass passages to permit flow of fluid therethrough in either direction when the filter becomes clogged and hinders the natural flow of fluid through the inner section chamber.

4. A triple valve device having a cap composed of inner and outer sections, each of which have chambers, the chamber of the inner section communicating with the piston chamber of the valve and also with the fluid supply means, and a filter mounted in the chamber of the inner cap section.

5. A triple valve device having a cap composed of inner and outer sections, each of which have chambers, the chamber of the inner section communicating with the piston chamber of the valve and also with the fluid supply means, and a filter mounted in the chamber of the inner cap section in juxtaposition to the piston chamber.

6. A triple valve device having a cap composed of inner and outer sections, each of which have chambers, the chamber of the inner section communicating with the piston chamber of the valve and also with the supply means therefor, a graduating spring mounted in the inner cap section in juxtaposition to the piston chamber, and a filter surrounding the graduating spring and adapted to intercept the fluid flowing from the chamber of the inner cap section into the piston chamber.

7. A triple valve device having a cap composed of inner and outer sections, a chamber in the inner section communicating with the piston chamber of the valve and also with the fluid supply means, a wall between the two chambers, vents in the wall, and a filter mounted in the chamber of the inner cap section and surrounding the vents in the wall.

8. A triple valve device having a cap composed of inner and outer sections, each of which have chambers, the chamber of the inner section communicating with the piston chamber of the valve and also with the fluid supply means, a filter mounted in the chamber of the inner cap section, a passage connecting the chamber of the inner cap section and the chamber of the outer cap section, and a valve normally closing the passage to prevent the flow of fluid through the chamber of the outer cap section, said valve being adapted to open the passage when the filter becomes clogged and permit the fluid to by-pass through the chamber of the outer cap section.

9. An attachment for triple valve devices comprising a cap composed of two sections, one of which has a chamber containing a cylinder having a graduating spring, a removable plate constituting one wall or the chamber, a perforated flange on the cylinder bearing against the plate, the perforations in the flange providing means for normally venting the chamber, and an annular filter mounted in the chamber, said filter surrounding the vents and enclosing the cylinder.

10. An attachment for triple valve devices comprising a cap composed of two sections, one of which has a chamber containing a cylinder having a graduating spring, a removable plate constituting one wall of the chamber, a perforated flange on the cylinder bearing against the plate, the perforations in the flange providing means for normally venting the chamber, an annular filter mounted in the chamber, said filter surrounding the vents and enclosing the cylinder, and means in the other cap section for by-passing the filter when the same becomes clogged.

11. A triple valve having a cap composed of two sections, one of which has a chamber containing a cylinder enclosing a graduating spring, a removable plate constituting a wall between the cap and the piston chamber of the valve, a perforated flange on the cylinder projecting through the plate, the perforations in the flange providing means through which the fluid flows between the cap and the valve, a filter mounted in the chamber and surrounding the perforations, the inner portion of the filter being hollow, by-passes connecting the portion of the chamber of the cap section exteriorly of the filter with the second cap section, valve devices for normally closing the by-passes, and means connecting the second cap section to the first cap section for directing the fluid to the hollow portion of the filter when either of the by-passes are open.

12. A triple valve device having a cap composed of inner and outer sections, each of which have chambers, the chamber of the inner section communicating with fluid supply means, a filter mounted in the chamber of the inner cap section, and means for permitting the fluid to by-pass the filter should the filter become clogged.

13. A triple valve device having a cap composed of inner and outer sections, each of which have chambers, the chamber of the inner section communicating with fluid supply means, a filter mounted in the chamber of the inner cap section, and means for permitting the fluid to by-pass the filter should the filter become clogged, said means being interposed between the chambers of the inner and outer cap sections.

14. A triple valve device having a cap composed of inner and outer sections, a filter in the inner section, means for directing the flow of fluid through the filter in the inner section and by-passing the outer section, and means for directing the flow of fluid through the outer section and by-passing said filter when the filter is clogged.

In testimony whereof I have hereunto set my hand, this 8th day of August, 1928.

CLYDE C. FARMER.